United States Patent Office 3,503,277
Patented Mar. 31, 1970

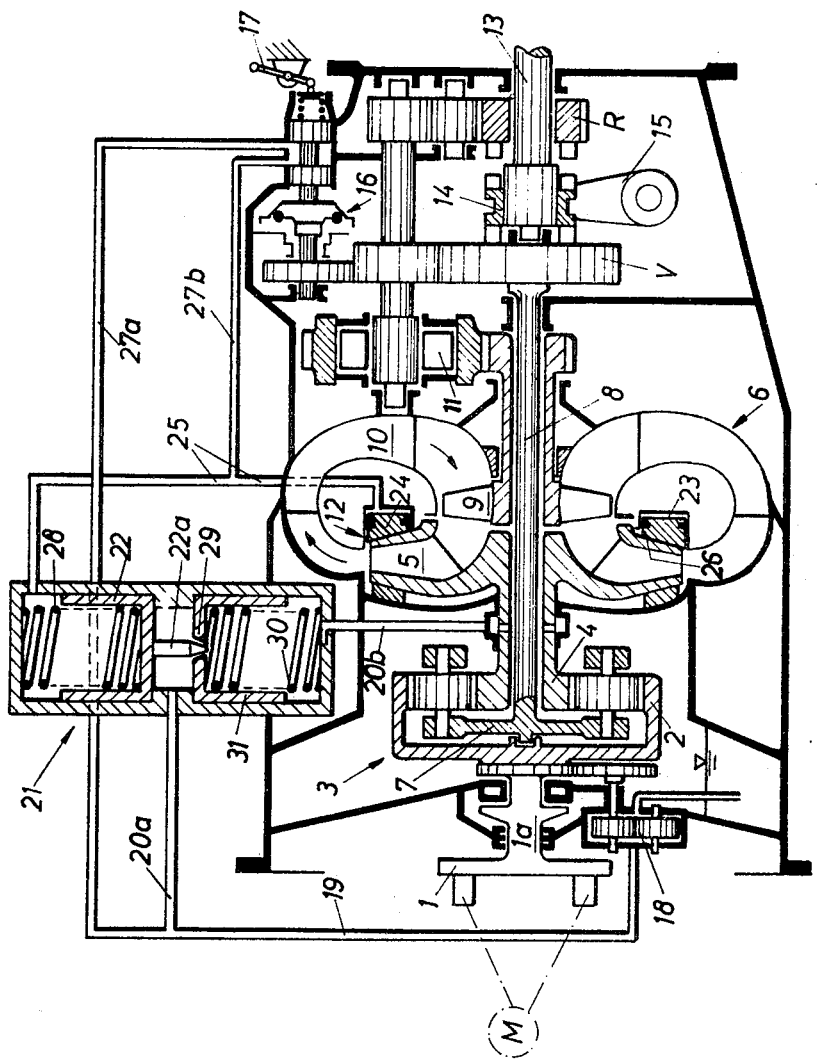

3,503,277
DIFFERENTIAL TORQUE CONVERTER
TRANSMISSION
Hellmut Weinrich, Zang kreis Heidenheim, and Ernst-Otto Sierck, Heidenheim (Brenz), Germany, assignors to Voith Getriebe KG, Heidenheim (Brenz), Germany
Filed Aug. 30, 1968, Ser. No. 756,496
Claims priority, application Germany, Sept. 9, 1967, 1,655,632
Int. Cl. F16h 47/08, 5/60; B60k 21/00
U.S. Cl. 74—645
4 Claims

ABSTRACT OF THE DISCLOSURE

A differential converter transmission with the power path divided into a mechanical and a hydrodynamic power path including a converter, which last mentioned power path may selectively be made ineffective by braking the pump wheel of said converter by means of a brake piston so as to arrest said pump wheel, while throttle means associated with said converter is operable to reduce the high pressure in said converter so that the braking pressure acting upon said braking piston will not have to work against a high inner pressure in said converter.

---

The present invention relates to a differential torque converter transmission for vehicles with a division of the driving power into a hydrodynamic power path (Föttinger converter) and a mechanical power path parallel to said hydrodynamic power path for use in the starting range while the hydrodynamic power path is within the ordinary driving range made ineffective by braking the pump wheel of the converter to a standstill. This braking is effected by means of a piston having its pressing surface exposed to the inner pressure of the converter, and by means of a pressure increasing pump used for filling the converter and for subjecting said piston to pressure, and by means of a shift-over device located in a feeding line leading to said piston and adapted automatically to bring about the shift over from one driving range to another driving range.

Transmissions of this type have been installed in commercial vehicles with great success. The stopping brake for the converter pump wheel is advantageously arranged in the interior of the converter, and the blade cover disc and the wheel disc of the primary wheel are used as braking surface. The piston pertaining to this brake is advantageously arranged in the core ring of the converter. In addition to affording a good use of the available space, the said arrangement also brings about a simplification of the construction and a saving in weight. The most important advantage is seen in the excellent heat withdrawal and the high life span of the brake thus obtained. Last, but not least, this solution avoids an additional idling friction of braking discs and the end faces of the pump wheel which cause a dragging friction anyhow are used as brake discs. The drawback of this brake arrangement, however, consists in that the press surface on the axially movable piston is exposed to the converter inner pressure which for reason of a good torque conversion in the starting range is to be selected as high as possible, so that in the control system of this transmission the pressing pressure must still be higher than the converter filling pressure.

This requirement has heretofore been met by arranging a pressure limiting valve, each on the pressure side of a pump in two parallel pressure conduits so that these pressure limiting valves throttle the feeding pressure to different magnitudes. This solution, however, has the drawback than an unnecessary high throttling energy is fed into the oil, which energy is lost as useful energy, heats up the oil and causes a premature aging thereof. Furthermore, the said solution forces the designer to reduce the inner pressure of the converter to a fraction of the pressure which is available and desirable, and to do so in view of the higher pressing pressure which, for reasons of safety, and in view of leakage losses of the simple volumetric increasing pump cannot be increased at will. In this connection it should be noted that in the starting range a considerably higher torque conversion can be realized when the inner pressure of the converter is increased. This, however, as mentioned above, is prevented by the heretofore employed filling and control system.

It is, therefore, an object of the present invention to provide a differential torque converter transmission which will overcome the above mentioned drawbacks.

It is another object of this invention to provide a differential torque converter transmission which will make possible as high an inner pressure as possible of the converter within the starting range while maintaining a simple pressure increasing pump, while nevertheless, within the ordinary driving range the braking piston will be exposed to a safe and desired pressure.

These and other objects and advantages of the invention will appear more clearly from the following specification, in connection with the accompanying drawing, illustrating a longitudinal section through a differential converter transmission with a throttling valve controlled by a shift-over device.

The differential converter transmission according to the invention is characterized primarily by a throttling valve arranged in the converter filling conduit, which throttling valve is controlled by a shift-over device and for purposes of reducing the converter filling pressure is arranged in the driving range, and more specifically, for reduction of the said converter filling pressure to a fraction of the pressure prevailing in the starting range.

This arrangement brings about that the full pump pressure can be made use of for filling the converter in the starting range while in the driving range with the converter pump wheel braked to a stop, the necessary pressure to be exerted upon the brake piston will be assured.

Referring now to the drawing in detail, the transmission shown therein comprises a coupling 1 adapted to be driven by a motor M. A drive shaft 1a is connected to said coupling 1 for driving the outer ring of a distributing transmission generally designated 3. The sunwheel 4 of the distributing transmission is connected to the pump wheel 5 of the torque converter 6, whereas the planetary gear carrier 7 is connected to the planetary gear carrier shaft 8.

During the starting stage, the planetary gear carrier shaft 8 is at a standstill, the sunwheel 4 and therefore the pump whel 5 are driven at a multiple motor speed depending on the transmission ratio of the distributing transmission. The oil in the converter 6 is circulated and transfers to the turbine wheel 9 a moment which is converted by support on guide wheel 10. The type of the blading and the deviation of the operating fluid brings about that the turbine 9 turns in counter direction which results in a high start conversion.

With increasing driving speed, the speed of the pump wheel 5 and thereby of the hydraulic power component decreases which latter is conveyed to the planetary gear shaft 8 through the converter 6, its turbine wheel 9, and the free wheel drive 11. At the same time the mechanical power component increases, which through the intervention of the planetary gear carrier of the distributing transmission 3 is conveyed directly through the planetary gear shaft 8 (hydro-mechanical power transmission).

When about half the maximum driving speed has been realized, the pump wheel brake 12 is automatically engaged whereby the converter 6 is made ineffective and the turbine wheel 9 through the free wheel drive 11 is disengaged from the planetary gear carrier shaft 8 (shift-over).

After this shift-over operation, the entire motor output is conveyed purely mechanically (mechanical power transmission) to the output shaft 13 through the intervention of the distributing transmission 3 and through the planetary gear shaft 8.

The converter 6 is followed by a simple jaw clutch transmission, the shiftable sleeve 14 of which may be selectively by a mechanical linkage 15 be moved into the position V (forward) and into the position R (rearward).

If desired, also another converter transmission, for instance, a disc shift transmission may be provided.

The automatic shift over into the mechanical driving condition is brought about by the centrifugal governor 16, which through the intervention of a spring loaded control piston brings about the braking or stopping of the pump wheel 5 through the intervention of the hydraulically operable pump wheel brake 12. Through the control lever 17 which is connected to a driving pedal, the time at which a shift over takes place will be so effected that the shift over occurs at partial load of the motor at a lower driving speed than when the motor is under full load.

The gear pump 18 is driven by the drive shaft 1a and supplies the converter 6, the pump brake 12 and all bearings with oil under pressure.

From the pressure side 19 of the gear pump 18 there branches off the filling conduits 20a, 20b leading to the converter and having the throttle valve 21 interposed therein.

From the pressure side of the gear pump 18 also the brake pressure conduits 27a, b branch off which have the centrifugal governor 16 interposed therein. The pressure side of the throttle needle piston 22 to which the throttle needle 22a is fastened communicates with the pressure side 23 of the pressing piston 24 of the pump wheel brake 12 through the conduit 25 into which the brake pressure conduit 27b leads. The press surface 26 of the pressing piston 24 is exposed to the inner pressure of the converter. If, by the centrifugal governor 16, the transmission is shifted over for purely mechanical power transmission, the pressing piston will, as illustrated, be caused to engage, and the throttle needle piston will be moved to its throttling position. Inasmuch as the conduit 20a and also the conduits 27b and 25 are subjected to the full pump pressure, the spring 28 on the pressure side of the throttle needle piston will when pressure equilibrium is established on both sides of said piston 22 move the latter to its throttling position. The pressure in the filling conduit 20b and in the interior of the converter drops to a fraction of the value of the oil pressure exerted upon the pressure side 23 of the piston 24. As a result thereof, the pressing force exerted by the piston will increase to the extent desired for engaging the brake. The pump wheel 5 comes to a stop.

The entire driving torque in the purely mechanical transmission range, namely, the driving range, is absorbed by the housing of the transmission through the sunwheel 4, the pump wheel 5, and the brake 12. In view of the drop of the converter inner pressure to a fraction of the pressure prevailing on the pressure side 23 of the piston 24 by employing the throttling in the filling conduit, this torque is limited to a certain admissible value. In rough operation of commercial vehicles for which the transmission is provided in particular, and in which frequently a sudden increase to a multiple of the driving or working resistance is encountered, the brake 12 and the limitation of the holding moment to a certain value represents a safety slip coupling for safeguarding the transmission of these vehicles. By a suitable selection of the magnitude of the cross section between throttle needle 22a and throttle nozzle 29, the magnitude of the throttle pressure and thereby the magnitude of the holding moment can be controlled.

In order to make sure that this pressure and the resulting holding moment in the course of time, for instance, by viscosity variations of the converter oil or by an increase in the converter leakage losses will not be subjected to variations, the nozzle 29 is arranged in the bottom of an axially movable hollow piston 31 which is supported by a spring 30, said piston 31 engaging an abutment. In view of this arrangement, for instance, with an increase in the pressure difference between pump filling pressure and the pressure in the interior of the converter (said increase being brought about by the throttling during the pure mechanical driving range), the cross section of the throttle will be increased and the original pressure difference will be restored.

It is, of course, to be understood that the present invention is, by no means, limited to the specific showing in the drawing, but that also modifications are possible, the scope of the invention being determined by the appended claims.

What we claim is:

1. A differential converter transmission, especially for vehicles, which comprises: a power input shaft, a power output shaft, power conveying means for conveying power from said input shaft to said output shaft, said power conveying means including a hydrodynamic power path and a mechanical power path arranged in parallel to each other, said hydrodynamic power path comprising a torque converter with a pump wheel adapted to be braked to a standstill, fluid operable brake piston means operable selectively to brakingly engage said pump wheel for bringing it to and holding it at a standstill during the normal speed of operation of said transmission to thereby operate said transmission without said hydrodynamic power path, said brake piston means having a first surface exposed to the fluid pressure in said converter and also having a second oppositely effective surface, pump means, conduit means leading from said pump means to said converter and to said second surface of said brake piston means for respectively conveying filling fluid to said converter and conveying actuating pressure to said brake piston means for a braking action thereof, control means arranged in said conduit means leading from said pump means to said second surface of said brake piston means and operable in response to said output shaft having reached a speed for which said control means have been set to shift said transmission from a first velocity range in which both of said power paths are effective to a second velocity range by causing said brake piston means to brake said pump wheel to a standstill thereby making said hydrodynamic power path ineffective, and throttle valve means arranged in said conduit means leading from said pump means to said converter and operable in response to said control means shifting said transmission from said first velocity range to said second velocity range to reduce the fluid pressure in said converter to a fraction of the pressure prevailing in said converter during the operation of said transmission within said first velocity range.

2. A transmission according to claim 1, which includes means associated with said throttle valve means and operable during the drive of said transmission within said second velocity range to maintain substantially constant the reduced pressure in said converter as effected by said throttle valve means in response to said control means shifting said transmission from said first velocity range to said second velocity range.

3. A transmission according to claim 1, which includes nozzle means forming part of said throttle valve means, a nozzle pin reciprocable in axial direction thereof and coaxially arranged with regard to said nozzle means, spring-urged piston means carrying said nozzle pin and continuously urging the same to move in a direction for closing said nozzle means, said spring-urged piston means having a fluid operable surface adapted when acted upon by fluid pressure to advance said nozzle pin toward said nozzle means, fluid conduit means establishing fluid communication between said fluid operable surface and said second oppositely effective surface of said brake piston means, and abutment means associated with said spring-urged piston means for limiting the movement of said nozzle pin in its closing direction with regard to said nozzle means.

4. A transmission according to claim 3, in which said nozzle means is movable in axial direction thereof and is resiliently and yieldably supported.

References Cited

UNITED STATES PATENTS

| | | | |
|---|---|---|---|
| 2,176,105 | 10/1939 | Schneider | 74—688 |
| 2,327,647 | 8/1943 | Jandasek | 74—688 X |
| 3,023,634 | 3/1962 | Weinrich et al. | 74—688 |
| 3,075,410 | 1/1963 | Weinrich et al. | 74—688 X |
| 3,076,353 | 2/1963 | Gsching | 74—645 |
| 3,096,667 | 7/1963 | Dickeson et al. | 74—731 |
| 3,105,393 | 10/1963 | Weinrich | 74—688 |

OTHER REFERENCES

German printed application 1,156,622 (1963).

DONLEY J. STOCKING, Primary Examiner

T. C. PERRY, Assistant Examiner

U.S. Cl. X.R.

74—688, 731